(12) United States Patent
McGraw

(10) Patent No.: US 7,195,486 B2
(45) Date of Patent: Mar. 27, 2007

(54) RECONFIGURABLE SIMULATION STRUCTURE

(76) Inventor: Robert W. McGraw, 543 Susan Dr., King Of Prussia, PA (US) 19406

( * ) Notice: Subject to any disclaimer, the term of this patent is extended or adjusted under 35 U.S.C. 154(b) by 545 days.

(21) Appl. No.: 10/635,021

(22) Filed: Aug. 6, 2003

(65) Prior Publication Data

US 2004/0029094 A1 Feb. 12, 2004

Related U.S. Application Data

(60) Provisional application No. 60/401,040, filed on Aug. 6, 2002.

(51) Int. Cl.
*G09B 19/16* (2006.01)
*G09B 9/02* (2006.01)
(52) U.S. Cl. ............... 434/29; 434/33; 434/38; 434/61; 434/69
(58) Field of Classification Search ........... 434/28–71, 434/365, 372, 373; 472/43; 463/47; 52/10; 428/35.7
See application file for complete search history.

(56) References Cited

U.S. PATENT DOCUMENTS

| | | | |
|---|---|---|---|
| 4,016,658 A | 4/1977 | Porter et al. | |
| 4,078,317 A | 3/1978 | Wheatley et al. | |
| 4,164,080 A | 8/1979 | Kosydar et al. | |
| 4,276,702 A | 7/1981 | Horwitz | |
| 4,348,186 A * | 9/1982 | Harvey et al. | 434/44 |
| 4,418,911 A * | 12/1983 | Bowers et al. | 463/47 |
| 4,490,117 A | 12/1984 | Parker | |
| 4,514,347 A | 4/1985 | Reed | |
| 4,551,101 A | 11/1985 | Neumann | |
| 4,599,070 A | 7/1986 | Hladky et al. | |
| 4,631,687 A | 12/1986 | Kowalski et al. | |
| 4,642,945 A * | 2/1987 | Browning et al. | 52/10 |
| 4,652,238 A | 3/1987 | Leavy | |
| 5,009,598 A | 4/1991 | Bennington | |
| 5,182,150 A * | 1/1993 | Carlos et al. | 428/35.7 |
| 5,286,202 A | 2/1994 | de Gyarfas et al. | |
| 5,316,480 A | 5/1994 | Ellsworth | |
| 5,374,971 A * | 12/1994 | Clapp et al. | 348/376 |
| 5,433,608 A * | 7/1995 | Murray | 434/29 |
| 5,490,783 A | 2/1996 | Stephens et al. | |
| 5,509,806 A | 4/1996 | Ellsworth | |
| 5,547,382 A * | 8/1996 | Yamasaki et al. | 434/61 |
| 5,564,984 A * | 10/1996 | Mirabella et al. | 472/43 |
| 5,634,794 A | 6/1997 | Hildreth et al. | |
| 5,724,775 A | 3/1998 | Zobel, Jr. et al. | |
| 5,791,903 A | 8/1998 | Feuer et al. | |
| 5,888,069 A | 3/1999 | Romanoff et al. | |
| 5,997,303 A * | 12/1999 | Yoshida et al. | 434/62 |

(Continued)

FOREIGN PATENT DOCUMENTS

JP 06230713 A * 8/1994

*Primary Examiner*—Joe H. Cheng
(74) *Attorney, Agent, or Firm*—Richard C. Litman

(57) ABSTRACT

A simulator structure with a deck for mounting various components including controls, one or two seats, an instrument panel and an image projector. The components are mounted to the deck using suitable fasteners, such as bolts and nuts. The image projector displays a computer-generated simulated environment. The instrument panel can include actual instruments or a computer-generated image. A dome-shaped image screen can be attached to the structure that can be tiltable on a horizontal axis or, alternatively, can be movable along an arcuate support.

14 Claims, 6 Drawing Sheets

U.S. PATENT DOCUMENTS

| | | |
|---|---|---|
| 6,106,298 A | 8/2000 | Pollak |
| 6,283,757 B1 | 9/2001 | Meghnot et al. |
| 6,319,008 B1 | 11/2001 | Mickelson et al. |
| 6,733,293 B2 * | 5/2004 | Baker et al. .................. 434/55 |
| 7,111,939 B2 * | 9/2006 | Cok et al. ...................... 353/7 |

* cited by examiner

RECONFIGURABLE SIMULATION STRUCTURE

CROSS-REFERENCE TO RELATED APPLICATION

This application claims the benefit of U.S. Provisional Patent Application Ser. No. 60/401,040, filed Aug. 6, 2002.

BACKGROUND OF THE INVENTION

1. Field of the Invention

The present invention relates to a reconfigurable simulator structure. More particularly, the structure is easily assembled and transported and can be configured to meet the simulation requirements of various types of vehicles, e.g., helicopters, fixed wing aircraft, submarines, and tanks.

2. Description of Related Art

The use of simulators for various types of aircraft, marine and land vehicles is well known. However, none teach the particular structure of the present invention which is easily assembled and disassembled, and which permits a wide variety of different components to be mounted in a modular fashion depending on the particular vehicle being simulated.

U.S. Pat. No. 4,016,658, issued to Porter et al. on Apr. 12, 1977, teaches a flight simulator software program that simulates realistic atmospheric conditions on a television monitor.

U.S. Pat. No. 4,078,317, issued to Wheatley et al. on Mar. 14, 1978, teaches a flight simulator system using a television monitor to display images and includes control input sensors and computer-generated environmental overlaps that simulate take-offs and landings.

U.S. Pat. No. 4,164,080, issued to Kosydar et al. on Aug. 14, 1979, teaches a simulator structure having an open strut construction and a motion system.

U.S. Pat. No. 4,276,702, issued to Horwitz on Jul. 7, 1981, teaches an aircraft flight-simulating trainer. Flight instruments are controlled with an astable and a stable vibrator to simulate actual conditions during the simulation.

U.S. Pat. No. 4,490,117, issued to Parker on Dec. 25, 1984, teaches an in-flight simulator to teach instrument flight rules (IFRs).

U.S. Pat. Nos. 4,514,347, issued to Reed on Apr. 30, 1985, and 4,631,867, issued to Reed on Dec. 30, 1986, teach a method of making a spherical projection screen for use in a simulator.

U.S. Pat. No. 4,551,101, issued to Neumann on Nov. 5, 1985, teaches a flight simulator structure which resembles the actual cockpit structure.

U.S. Pat. No. 4,599,070, issued to Hlady et al. on Jul. 8, 1986, teaches a simulator in which both the controls and the imaging software are provided so that input from the controls can be sensed and inputted to a computer. An instructor console is also provided.

U.S. Pat. No. 4,652,238, issued to Leavy on Mar. 24, 1987, teaches a simulator including software and some hardware for providing a limited field of view (LFOV) for a pilot.

U.S. Pat. No. 5,009,598, issued to Gennington on Apr. 23, 1991, teaches a simulator connected to an inoperative aircraft in which the windshield includes a visual display and the controls feed signals to the computer.

U.S. Pat. No. 5,286,202, issued to de Gyarfas et al. on Feb. 15, 1994, uses an aircraft cockpit connected to a computer.

U.S. Pat. No. 5,316,480, issued to Ellsworth on May 31, 1994, uses a portable module (trailer) in which several persons can experience a simulation. A curved projection screen and several projectors are used to display the simulated images.

U.S. Pat. No. 5,490,783, issued to Stephens et al. on Feb. 13, 1996, teaches actual flight instruments in a bezel in a cockpit simulator, which are manipulated by a computer. A curved projection screen is also shown.

U.S. Pat. No. 5,509,806, issued to Ellsworth on Apr. 23, 1996, teaches a simulator including multi-media sights and sounds and motion.

U.S. Pat. No. 5,634,784, issued to Hildreth et al. on Jun. 3, 1997, teaches a system for converting manipulated loads, e.g., torque exerted, into processable signals.

U.S. Pat. No. 5,724,775, issued to Zobel, Jr. et al. on Mar. 10, 1998, teaches a portable multi-piece dome that can easily be disassembled, transported, and assembled.

U.S. Pat. No. 5,791,903, issued to Feuer et al on Aug. 11, 1998, teaches a cockpit simulator including a three-panel rear-projection screen.

U.S. Pat. No. 5,888,069, issued to Romanoff et al. on Mar. 30, 1999, teaches a portable (trailer-mounted) simulator including demountable components.

U.S. Pat. No. 6,106,298, issued to Pollak on Aug. 22, 2000, teaches a readily reconfigurable simulator including a frame structure for mounting the components. The simulator can be configured for use to simulate any of various vehicles. The set of instruments and controls are provided in a "kit", one kit for each type of vehicle. Also, the frame structure is assembled according to the type of kit being installed. Although the patent states that the support frame is made up of "easily assembled" parts and that the various components are "releasably coupled" to the frame, the reference lacks any details regarding the actual manner in which the components are attached.

U.S. Pat. No. 6,283,757, issued to Meghnot et al. on Sep. 4, 2001, teaches a full motion interactive simulator having a small footprint.

U.S. Pat. No. 6,319,008, issued to Mickelson et al. on Nov. 20, 2001, teaches an avionics simulator having a central processor including a programmable emulator to replicate aircraft operation, responses and data input.

The prior art lacks any teaching of a modularized structure that is easily transported, assembled and disassembled, and reconfigured according to any of a wide range of simulator settings. This invention meets that need.

None of the above inventions and patents, taken either singly or in combination, is seen to describe the instant invention as claimed.

SUMMARY OF THE INVENTION

The present invention is directed to a simulator structure. More particularly, the structure is easily assembled or disassembled and can be reconfigured to accommodate any of various components required for a particular simulator setting, by attaching the components to a deck. The simulator can be used for military and commercial aircraft, such as helicopters and fixed wing aircraft, land vehicles, such as HUMVEEs and tanks, and marine craft, such as submarines.

The types of components that can be mounted to the deck of the structure include single or dual seats, controls, visual displays and projector supports. The components are either already capable of being mounted directly to the deck or can easily be modified to provide this capability.

Accordingly, it is a principal object of the invention to provide a simulator structure that is capable of mounting various simulator components, such as seats, controls, visual displays, and projectors.

It is another object of the invention to provide a simulator structure as described in which the image screen is dome-shaped and is attachable to the structure.

It is another object of the invention to provide the above simulator and dome screen in which a plurality of projectors is used to project the simulator image.

It is another object of the invention to provide a dome-shaped screen and mount therefor for use in a simulator in which the dome can be tilted on a horizontal axis.

It is a further object of the invention to provide a dome-shaped screen and mount therefor for use in a simulator in which the dome is movable along an arcuate support.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a simulator structure capable of mounting any of various components, e.g., one or two seats, controls, visual displays for instruments, and image projectors, for simulating the control environment of a vehicle.

In its assembled form, it provides an elevated support including a deck for attaching seats used by simulation users (e.g., a pilot and crew) as well as for mounting various replaceable components, such as controls, instrumentation and image projectors. The structure can be used for simulation of vehicles in a large variety of settings, depending upon the particular configuration of the vehicle cockpit, i.e., the enclosure that is occupied by the pilot and crew during vehicle operation and navigation. The settings, for example, can include helicopters, fixed wing aircraft, submarines, and tanks and can be used in military or commercial applications.

Figure 1:
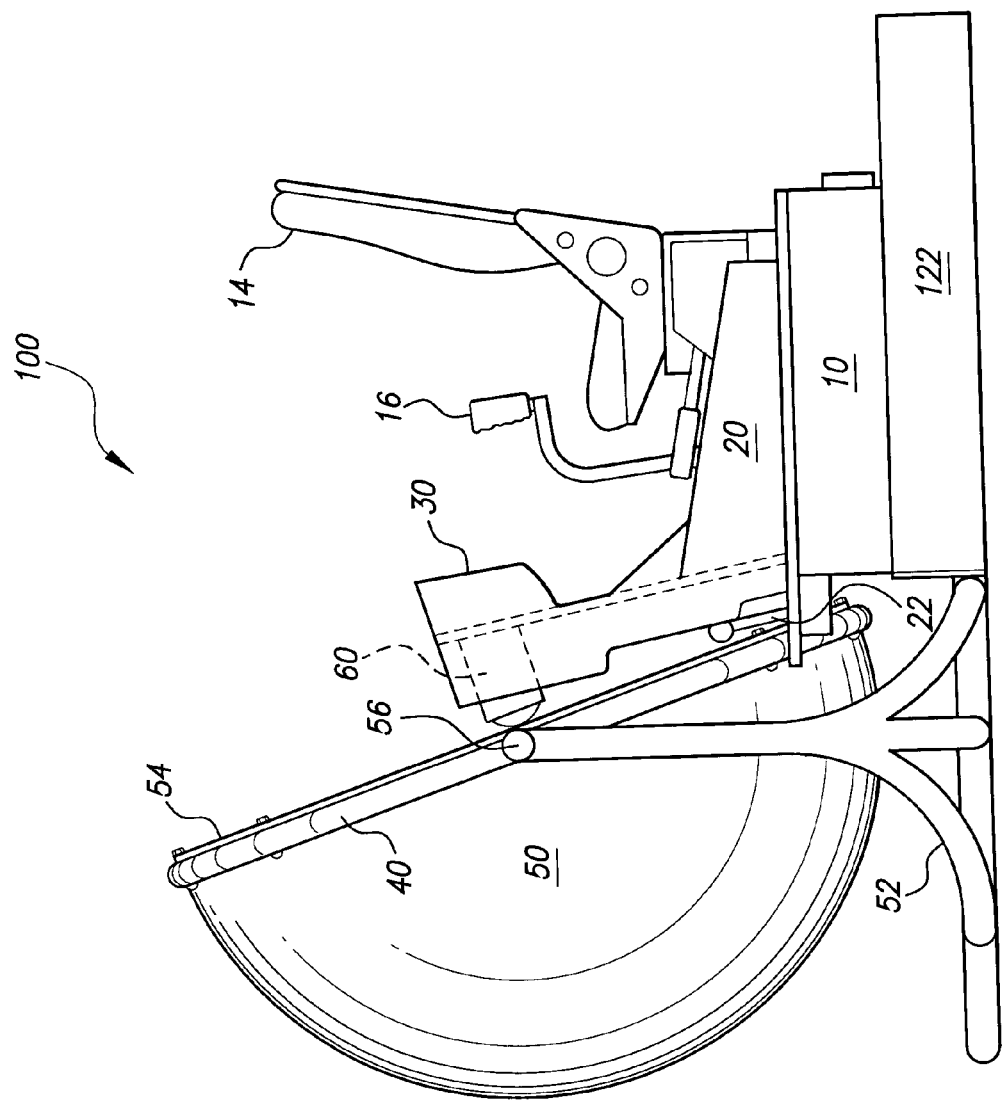
FIG. 1 is a perspective view of a reconfigurable simulation structure according to the present invention showing a dome-shaped projection screen.

FIG. 1 shows the simulator 100 with a tilting dome-shaped projection screen 50. The user is seated in chair 14 and operates controls, such as cyclic 16 (used in helicopter simulation). The instrument console 20 can contain either actual instruments that are controlled by a microprocessor, or a liquid crystal display (LCD) panel 30 that shows the instruments. An opening in the top of the instrument console is proportioned so that components can be mounted inside and held in place.

All components are mounted to the support frame 10 that includes a grid deck plate 13 on its upper surface to which the components are attached, e.g., with bolts and nuts or other fasteners. The grid deck plate can be provided with a plastic template 15 having cutouts sized and shaped for aligning the components in an arrangement identical to that on a selected vehicle configuration to be simulated. Different templates are provided for precision alignment of cockpit controls consoles and seats for different aircraft or vehicle configurations. An additional lower tier support (only half of the support is shown as item 122) provides a convenient step to reach the upper surface.

Pedals 22 are mounted to the side of the support frame 10 close to the upper edge to provide rudder control.

Figure 2:
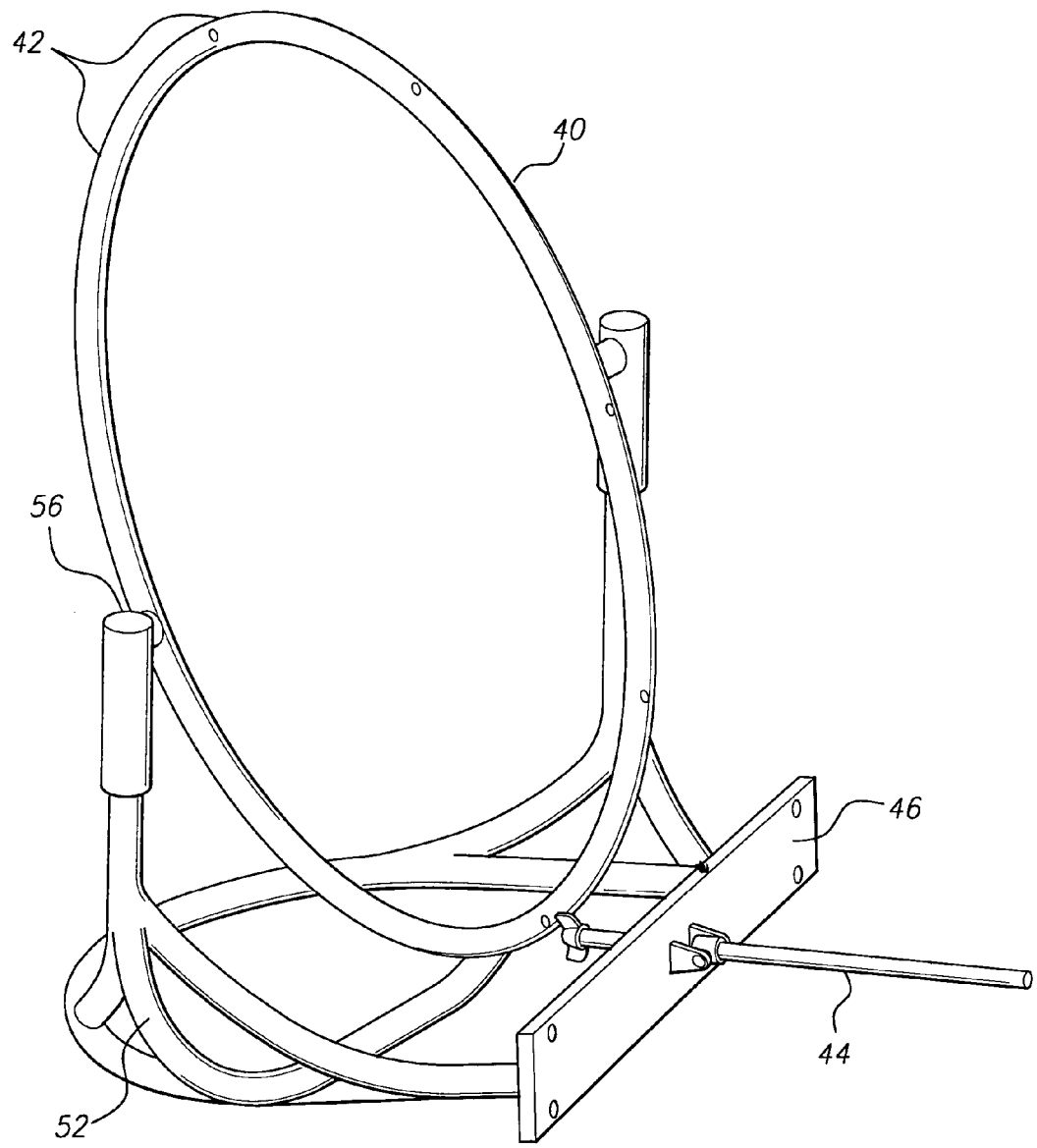
FIG. 2 is a perspective view of a tiltable ring mount for the dome of FIG. 1.

Referring to FIGS. 1 and 2, a hemispherical dome 50 having a flange 54 is shown attached to a retaining ring 40. Bolts and nuts (or other fasteners) can be used to attach the dome to the ring through the holes 42. Support legs 52 for the dome include a pivot 56 that permits the dome to tilt back-and-forth. The support legs are attached to the lower tier support 122 by placing the plate 46 against the front side of the support 122 and connecting the bayonet 44 to the frame to hold it in place. The bayonet 44 also permits the dome support to be adjusted back-and-forth horizontally with respect to the lower frame 12 to adjust the distance of the screen relative to the user.

Etched marks can be provided on the dome 50 that indicate the tilt of the dome 50 relative to vertical and can be matched with similarly etched marks on the projector mount to permit the user to adjust the projector to match its angle with the tilt of the dome to prevent image bleed along the edges of the screen. The dome 50 can be tilted between a 20° to 30° tilt angle to adjust the field of view (FOV) of the user. The projector is provided with a specially designed lens to ensure placement of the image completely onto the screen, i.e., to create an "immersion" setting for the user.

The dome 50 can be made of any suitable material that provides a satisfactory surface to receive a projected image, such as fiberglass or a molded plastic material. Also, the dome material can be MYLAR (Mylar is a trademark of E. I. duPont de Nemours & Co.) formed into a dome shape, in which case the image can be projected from behind the screen as well as from the front.

The support legs 52 can be any structural material, but is preferably made of aluminum to decrease weight during transport of the structure.

Figure 3:
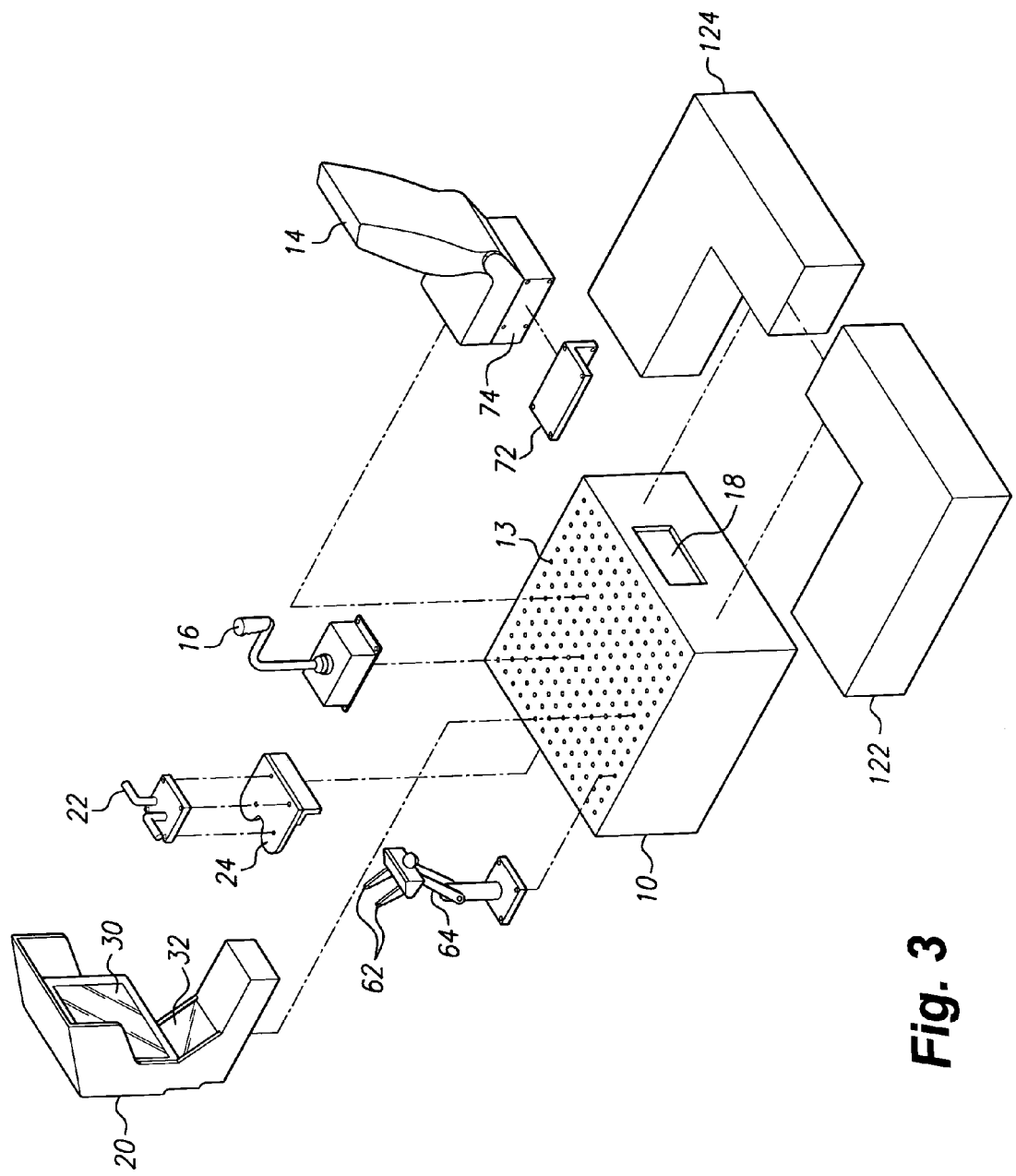
FIG. 3 is an exploded view of the simulator structure without the projection screen.

FIG. 3 shows an exploded view of the support structure 10 without the projection screen or template 15 and including several components showing their placement on the grid deck plate 13. A seat 14 and its mount 74 are shown. To the side of the seat mount 74, a collective mount bracket 72 is attached.

Additional components include a cyclic 16 and a panel 20 or other suitable control devices for aircraft or other vehicles.

The panel 20 includes an upper opening 30 for mounting an instrument panel or an LCD display. A lower opening 32 can provide a mount for other LCD displays. Also, a projector support 64 includes support projections 62 for mounting one or multiple projectors to support front projection screens as an option to the dome screen. The projector support can be adjusted to tilt or rotate to ensure that the projects are accurately placed at the proper angle to align with the projection screen.

All components can be mounted to grid deck plate 13 of the frame 10 using bolts and nuts (or other fasteners that hold the components firmly in place). Rather than a set of discrete tapped holes on the grid deck plate, a convenient rail-like structure (not shown) can be provided in the surface of the grid deck plate to permit the lateral adjustment of the components. The rail-like structure can be made by providing a channel with a series of spaced, tapped (threaded) holes. The mounts of the components can then be modified to ensure that they are easily placed into the channel and can be fixed in place as needed.

Rudder or other foot pedal controls 22 are mounted onto a bracket 24 that can be attached to the front side edge of the frame. An opening 18 in the main support structure 10 provides a place for the computer and for storage. Lower frame 12 includes lower tier components 122 and 124.

Figure 4:
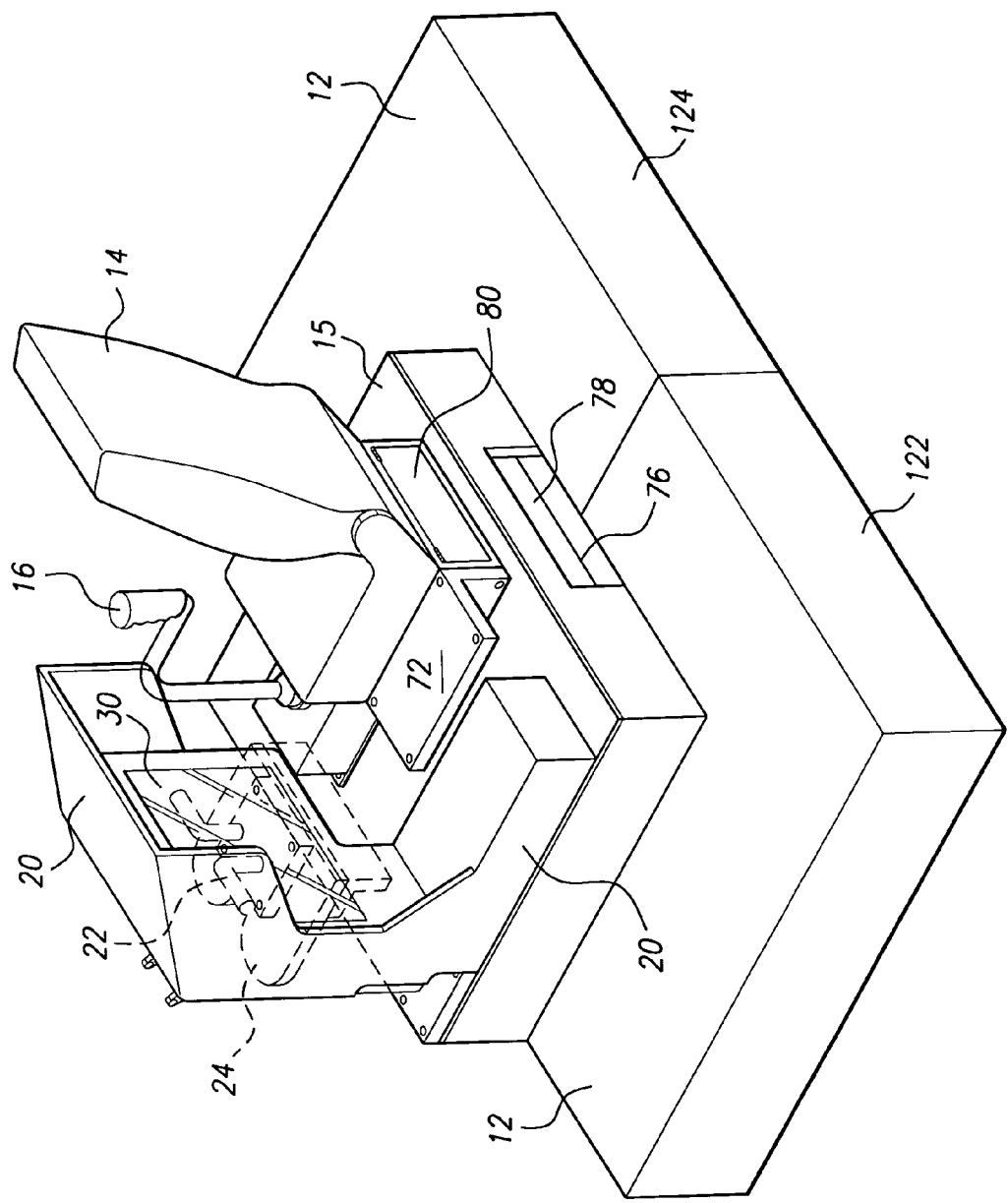
FIG. 4 is a perspective view of the simulator as seen from the rear of the structure.

FIG. 4 shows a view of the fully assembled simulator without the projection screen. A rack-type power supply 78, computer 76 and an additional storage area 80 below the seat 14 are also shown. The computer 76 can include an image processor that outputs to the projector, or to three (or more) projectors, as in the case of a multi-channel simulator. The structure can also include a separate flight dynamics computer. Both computers can receive and exchange information between each other and from feedback sensors in the control components. These computers and sensors are known in the field of simulators, as are electrical connectors used to connect the sensors from the control components to the computers.

Figure 5:
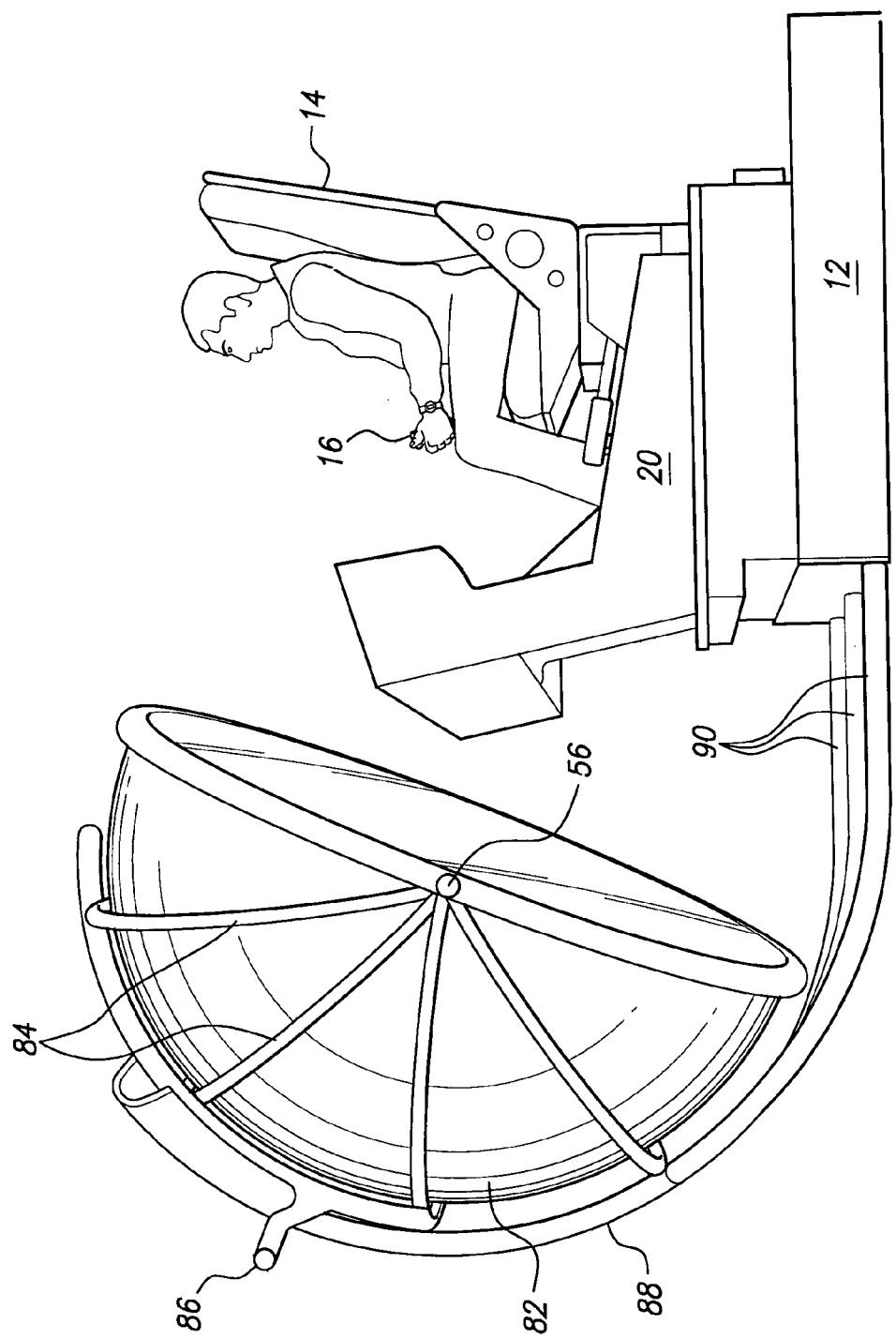
FIG. 5 is a side view of a second embodiment of a dome-shaped projection screen.

FIG. 5 shows an assembled simulator with an alternative dome support in place. In this embodiment, the dome 82 is attached to a pair of arcuate supports 88. A spider frame structure holds the dome 82 and is attached to the arcuate supports 88 through a mount 84 with an adjustment 86. The lower ends 90 of the legs of the support are positioned and held in the lower frame structure 12. Rubber wheels (not shown) can be provided either on the arcuate supports 88 to roll against the dome mount (or be provided on the movable dome mount 84 to roll against the arcuate frame) to provide resilient and smooth movement when changing the angle of the dome.

Figure 6:
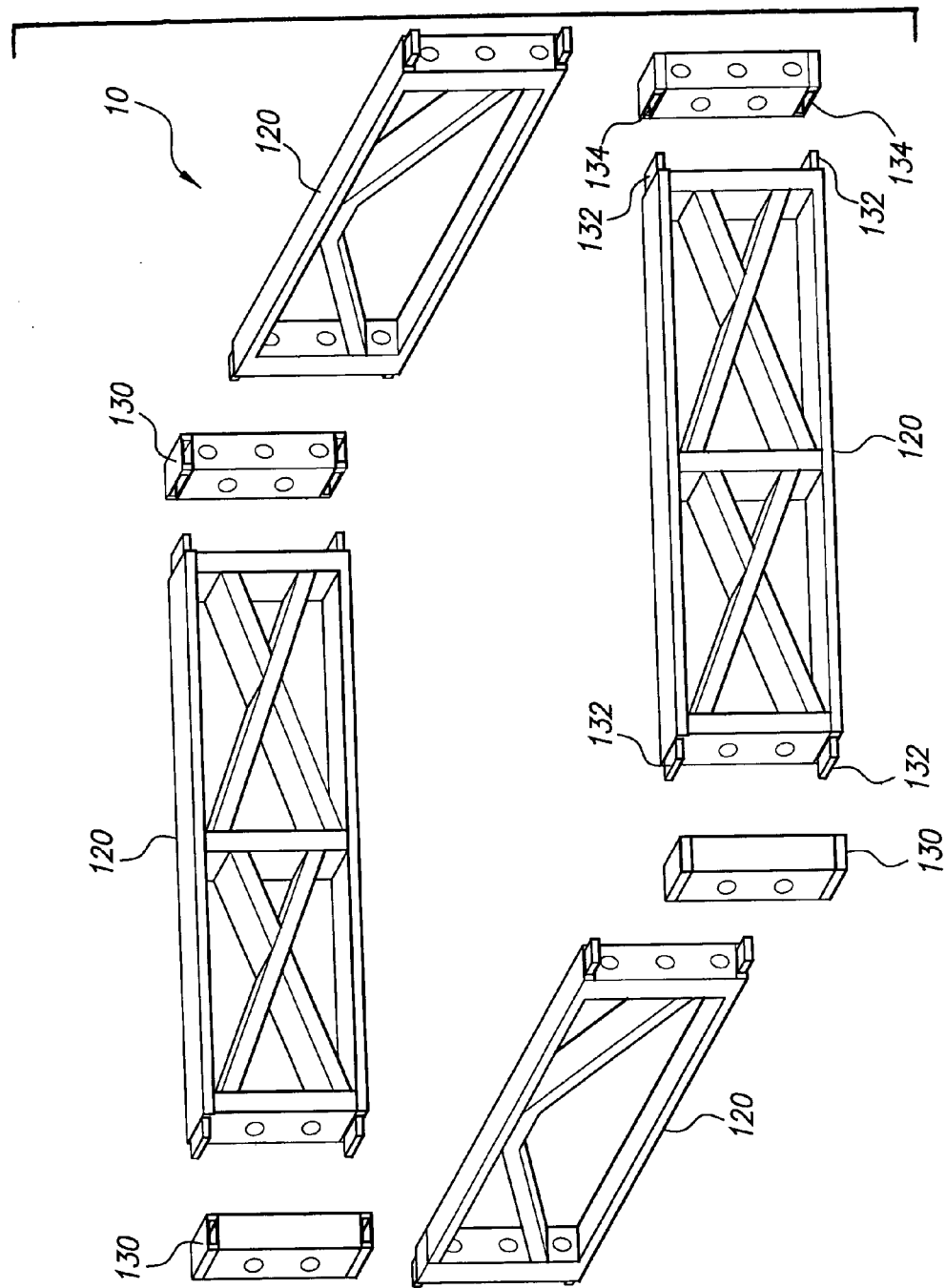
FIG. 6 is an exploded view of the frame structure for the structure.

The main support structure 10 and the lower frame 12 frames are made by assembling a set of frame members as shown in FIG. 6 and then covering the frame, e.g., with aluminum skins, and a grid deck plate (can also be made of aluminum). Main support structure 10 (without the skins or grid deck plate), in this case, is assembled by attaching the ends of side members 120 into corresponding end posts 130 so that the projecting portions 132 in the side members fit into the corresponding notches 134 in the end posts. Attachment pins (not shown) can then be passed through vertical openings (not shown) in the tops of the posts to hold the assemblies together.

It is to be understood that the present invention is not limited to the sole embodiments described above, but encompasses any and all embodiments within the scope of the following claims.

I claim:

1. A reconfigurable simulator structure comprising:
   a two-tier support frame having:
   a main support frame having an upper surface, the upper surface having means for removably supporting a plurality of simulator components; and
   a lower tier support frame for adjustably supporting a projection screen and providing a step up to the upper surface of the main support frame;
   a plurality of simulator components, including at least one seat, sets of control devices, visual displays, instrument consoles, and image projectors, each simulator component being selectively and removably attached to the upper surface of the main support frame; and
   means for adjusting the viewing angle and distance of the projection screen including a pivot and a bayonet assembly moveably connected to the lower tier support frame.

2. A simulator structure according to claim 1, wherein said means for removably supporting a plurality of simulator components comprises a grid deck plate having a plurality of mounting holes therein configured in an array for securing the simulator components to the upper surface with nuts and bolts.

3. A simulator structure according to claim 2, wherein the upper surface is provided with a plastic template allowing said main support frame to support one of several optional vehicle or aircraft configurations.

4. A simulator structure according to claim 1, wherein the upper surface is provided with a plastic template allowing said main support frame to support one of several optional vehicle or aircraft configurations.

5. A simulator structure according to claim 1, further including means for adjusting the viewing angle and distance of the projection screen to optimize the operator's field of view.

6. A simulator structure according to claim 5, wherein the means for adjusting includes a pivotal projector mounting assembly providing horizontal, vertical and elevation adjustability along multiple axis angles to optimize display field of regard and operator field of view.

7. A simulator structure according to claim 1, wherein the visual displays include an instrument panel.

8. A simulator structure according to claim 7, wherein the sets of control devices include foot pedal controls mounted onto a bracket attached to a front side of the main support frame.

9. A simulator structure according to claim 8, wherein the main support frame defines an open region adapted for receiving a computer and storage.

10. A simulator structure according to claim 1, wherein the means for adjustment further includes a pair of arcuate supports, and a spider frame moveably connected to the arcuate supports through a mount with an adjustment.

11. A simulator structure according to claim 10, wherein the upper surface, main support frame and the lower tier support frame are constructed of a set of easily assembled frame members.

12. A simulator structure according to claim 11, wherein the main support frame and the lower tier support frame are covered with aluminum skins or plates.

13. The simulator structure according to claim 1, wherein the projection screen is formed as a hemispherical dome.

14. The simulator structure according to claim 1, wherein the visual displays include an LCD display.

* * * * *